United States Patent
Chao et al.

(10) Patent No.: US 9,578,988 B2
(45) Date of Patent: *Feb. 28, 2017

(54) GRILL PAN

(75) Inventors: Ling-Chin Chao, Taipei County (TW); Lifeng Xie, Fujian Province (CN)

(73) Assignee: Tsann Kuen (Zhangzhou) Enterprise Co., Ltd., Fujian Province (CN)

(*) Notice: Subject to any disclaimer, the term of this patent is extended or adjusted under 35 U.S.C. 154(b) by 141 days.

This patent is subject to a terminal disclaimer.

(21) Appl. No.: 12/762,594

(22) Filed: Apr. 19, 2010

(65) Prior Publication Data

US 2010/0263554 A1  Oct. 21, 2010

(30) Foreign Application Priority Data

Apr. 17, 2009  (CN) .................... 2009 2 0137778 U

(51) Int. Cl.
*A47J 37/07* (2006.01)
*A47J 37/06* (2006.01)

(52) U.S. Cl.
CPC .................... *A47J 37/067* (2013.01)

(58) Field of Classification Search
USPC ......... 99/447, 448, 422, 446, 380, 400, 372, 99/375, 425–426; 219/401, 524, 525, 415
See application file for complete search history.

(56) References Cited

U.S. PATENT DOCUMENTS

| | | | |
|---|---|---|---|
| 113,886 A * | 4/1871 | Howard | 99/446 |
| 3,369,481 A * | 2/1968 | Pappas | 99/445 |
| D229,532 S * | 12/1973 | Colato | |
| D251,653 S * | 4/1979 | Mason, Jr. et al. | |
| 5,453,574 A * | 9/1995 | Zuran et al. | 126/41 R |
| 5,606,905 A * | 3/1997 | Boehm et al. | 99/375 |
| 6,994,017 B2 * | 2/2006 | Lerner | 99/376 |
| RE40,285 E * | 5/2008 | Wu | 99/331 |
| 2004/0020370 A1* | 2/2004 | Jackson et al. | 99/331 |
| 2010/0162903 A1* | 7/2010 | Chen et al. | 99/422 |

FOREIGN PATENT DOCUMENTS

JP      2001037650    *  2/2001  .............. A47J 37/06

* cited by examiner

*Primary Examiner* — Phuong Nguyen
(74) *Attorney, Agent, or Firm* — Edward E. Sowers; Brannon Sowers & Cracraft PC

(57) ABSTRACT

The present invention provides a grill pan comprising a main body, plural ribs parallel disposed on the main body, characterizes in that each rib comprises multiple integral segments and is respectively disposed axially on said main body and one end of each segment forms a crest portion along the radial direction and the other end of each segment forms a trough portion along the radial direction and connects to the crest portion of adjacent segment. It forms a new appearance and acquires a pleasing aesthetic effect by applying such structure, at same time, the food will be effectively prevented from slipping on the rib when it is grilled by the grill pan, so the grill degree of the grilled food is more uniform and delicious, moreover, the transverse rib marks will be formed by the crest structure by each rib besides the vertical rib marks formed by the original vertical ribs, so the juice will be sealed from the surface of the grilled beef, thus the delicious flavor is kept.

5 Claims, 2 Drawing Sheets

GRILL PAN

FIELD OF THE INVENTION

The present invention relates to a kitchen appliance, especially to a grill pan.

BACKGROUND OF THE INVENTION

With rapid progress of modern technology and the continuous promotion of the human living standard, various kinds of kitchen appliances with multiple functions are applied in our daily lives, and great convenience are brought by such appliances. By applying the multiple functions of such various kitchen appliances, the food can be cooked by different manners, for example as fry\roast\bake\braise\steam\grill\stir-fry, and so on, so the human living standard is being continuously promoted. The present hamburger machine usually equipped with a grill pan, several ribs are parallel arranged on the grill pan, firstly, the ribs can prevent the food on grill pan from easily removed; secondly, the interval between the ribs can equably grill the food. The height of rib of the conventional grill pan is basically similar, when the food is grilled on the rib, the grill degree would not be uniform, for example, the food which leans on the rib would not acquire a good grill degree; further, the rib mark is not obvious, so the food will easily slip on the ribs.

SUMMARY OF THE INVENTION

The objective of the present invention is to overcome the shortages of the conventional technique, providing a grill pan, by improving the structure of the ribs of the grill pan, the food will be effectively prevented from slipping on the ribs and the grilling effect will be ensured, so the grilling effect of the grilled food is more uniform, the food will be more delicious.

The technical solution applied by the present invention is: a grill pan, comprising a main body, plural ribs parallel disposed on the main body; each rib comprises multiple integral segments and respectively disposed axially on said main body and one end of each segment forms a crest portion along the radial direction, and the other end of each segment forms a trough portion along the radial direction and connects to the crest portion of adjacent segment.

The breadth of each 1 rib is the same and the interval between each adjacent rib is the same; further, the ratio of the breadth between the central line of each adjacent rib and the breadth of rib is equal or less than 3.

The breadth of said each vertical rib is 5.5 mm; the interval between each adjacent rib is 15.5 mm.

The length of said each segment is 50 mm.

The ratio of the thickness of the trough portion to the thickness of said grill pan is larger than 1.

The ratio of the thickness of the crest portion to the thickness of the trough portion is equal or larger than 1.5.

An arc transition with radius R is between the crest and trough of said each adjacent segment.

Said radius R is 4 mm.

The grill pan of the present invention designs the ribs of the grill pan as a multiple segment structure, moreover, an end of each segment is designed as crest structure along the thickness structure, another end is designed as trough structure along the thickness structure, the crest and trough is connected between each adjacent segment, thus each vertical rib will form a concavo-convex wave. The crest to the trough in the segment is a gradual slope structure, the crest to the trough between the segments is a steep slope structure, an arc transition with radius R is applied herein; thus, it will form a gradual slope structure by one side and a steep slope structure by another side from one crest to its adjacent two troughs, so a unsymmetrical wave is formed. A plurality of segments are disposed inside each vertical rib, the length of segment is similar, thereby, viewed from the side face, the wave of vertical rib is a regular wave periodically changed; certainly, the length of segment can be different, when it is different, viewed from the side face, the wave of vertical rib is not periodically changed. The segment of each rib on the grill pan is distributed correspondingly, so a plurality of rib marks will also be formed transversely on the vertical ribs by said distribution, the transverse rib mark is formed by the crest structure of each rib; certainly, the segment of each ribs of the grill pan can also be dislocated, a plurality of rib marks will also be formed transversely on the vertical ribs by said dislocation, the difference is: the transverse rib marks are formed by the crest structure of each interval ribs.

The beneficial effects of the present invention is: because each vertical rib is axially designed as an integral multiple segments, further an end of each segment is designed as a crest structure along the radial direction, another end is designed as a trough structure along the radial direction and connects to the crest portion of adjacent segment. The rib with such wave structure, firstly it forms a new appearance and acquires a pleasing aesthetic effect; secondly when the food is laid or grilled, it would be prevented from slipping; thirdly the shortages of the nonuniformity of grill degree of the food and the nonobviousness of the rib mark would be overcome, so the grill degree will be more uniform and the food will be more delicious; fourthly a predetermined continuous interval grill degree will be formed along certain direction, so it will achieve a beautiful grilling color; fifthly the transverse rib marks will be formed by the crest structure by each rib besides the rib marks formed by the original ribs, so the juice will be sealed from the surface of the grilled beef, thus the delicious flavor is kept. Because the thickness of the trough of said segment is defined as H2, the thickness of grill pan is defined as T, the ratio of H2 and T is larger than 1, and the thickness of the crest of said segment is defined as H1, the thickness of the trough of said segment is defined as H2, the ratio of H1 and H2 is equal or larger than 1.5, so the height of the rib is more reasonable, the oil will be successfully extracted, it is more healthier since the processing time of the food is reduced. Because an arc transition with radius R is applied from the crest to the trough between the adjacent segments, it will prevent the meat from slipping and be convenient for the consumer to put the grilled hamburger meat to the plate. Because the ratio of the breadth between the central line of each adjacent rib and the breadth of rib is equal or less than 3, the interval between each rib and the breadth of the rib is designed with a golden ratio, so when the soft meat is laid or grilled, it will be prevented from slipping and contacting with the grill pan surface, so the oil extraction will be prevented, the disadvantage of the grilling effect will be eliminated.

The present invention will be fully explained by the accompanying drawings and the description of the embodiments, however, the grill pan of the present invention is not limited within.

DETAILED DESCRIPTION OF THE EMBODIMENTS

Figure 1:
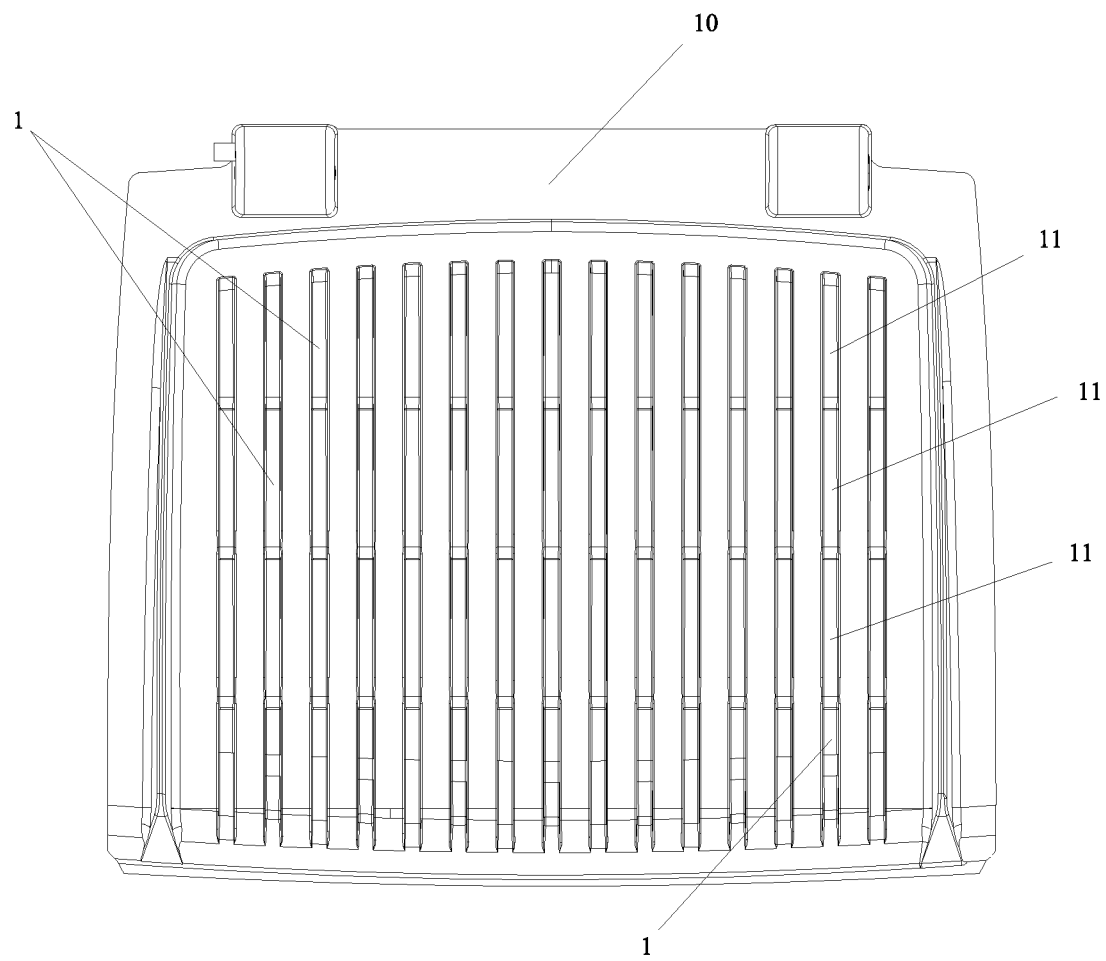
FIG. 1 is the structural view of the present invention.
Figure 2:
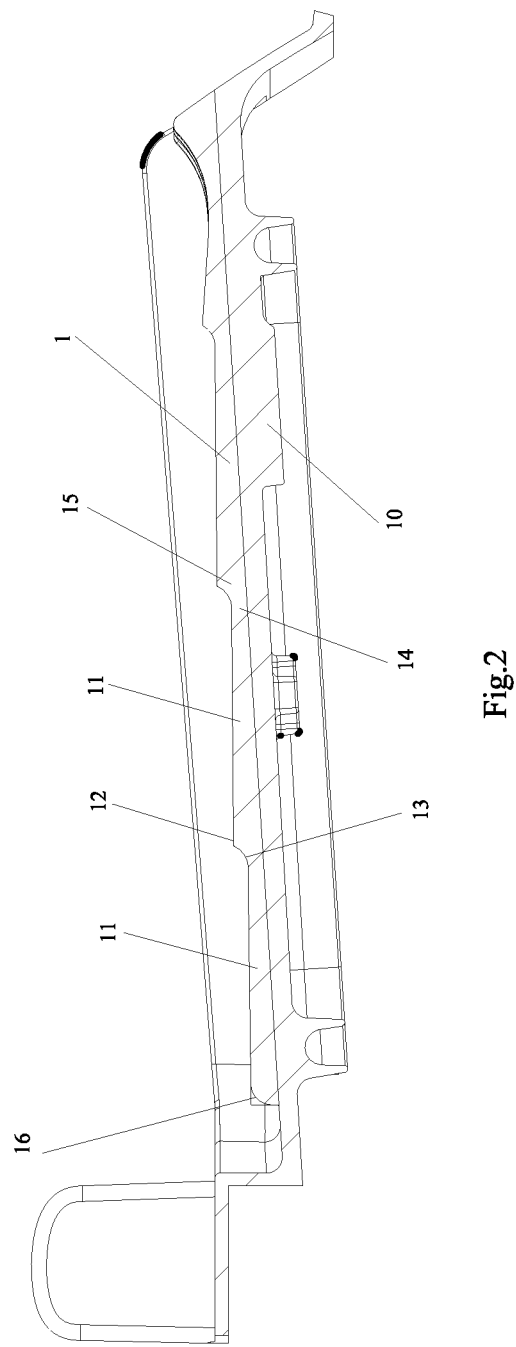
FIG. 2 is the sectional view along the axis of the rib of the present invention.

Please refer to the accompanying drawings, the grill pan of the present invention, comprising a main body 10, a plurality of ribs 1 parallel disposed on the main body 10; each rib 1 is respectively disposed axially to form an integral multiple segments 11; an end of each segment 11 forms a crest structure 12 along the radial direction, and the other end of each segment 11 forms a trough structure 13 along the radial direction and connects to the crest portion of adjacent segment 11. As illustrated in FIG. 2, each segment 11 also includes a gradual slope portion that integrally connects the crest structure 12 and the trough structure 13.

Wherein:

The breadth of each rib 1 is the same; and the interval between each adjacent rib 1 is similar; further, the ratio of the breadth between the central line of each adjacent rib and the breadth of rib is equal or less than 3.

The breadth of said each rib 1 is 5.5 mm; the interval between each adjacent rib 1 is 15.5 mm.

The length L of said each segment is 50 mm.

The thickness of the trough 14 of said segment 11 is defined as H2, the thickness of grill pan 10 is defined as T, the ratio of H2 and T is larger than 1.

The thickness of the crest 15 of said segment 11 is defined as H1, the thickness of the trough 14 of said segment 11 is defined as H2, the ratio of H1 and H2 is equal or larger than 1.5.

An arc transition 16 with radius R is between the crest and trough of said each adjacent segment.

Said radius R is 4 mm.

The grill pan of the present invention designs the vertical ribs 1 of the grill pan as a multiple segments structure, moreover, an end of each segment 11 is designed as crest structure 12 along the radial structure, another end is designed as trough structure 13 along the radial structure, the crest and trough is connected between each adjacent segment 11, thus each rib 1 will form a concavo-convex wave. The crest to the trough in the segment is a gradual slope structure, the crest to the trough between the segments is a steep slope structure, an arc transition with radius R is applied herein; thus, it will form a gradual slope structure by one side and a steep slope structure by another side from one crest to its adjacent two troughs, so a unsymmetrical wave is formed. A plurality of segments 11 are disposed inside each vertical rib 1, the length of segment 11 is the same, thereby, viewed from the side face, the wave of rib 1 is a regular wave periodically changed; certainly, the length of segment can be different, when it is different, viewed from the side face, the wave of vertical rib is not periodically changed. The segment 11 of each vertical rib 1 on the grill pan is distributed correspondingly, so a plurality of rib marks will also be formed transversely on the vertical ribs 1 by said distribution, the transverse rib mark is formed by the crest structure of each rib; certainly, the segment of each rib of the grill pan can also be dislocated, a plurality of rib marks will also be formed transversely on the ribs by said dislocation, the difference is: the transverse rib marks are formed by the crest structure of each interval ribs.

Although the present invention has been described with reference to the preferred embodiments thereof for carrying out the invention, it is apparent to those skilled in the art that a variety of modifications and changes may be made without departing from the scope of the present invention which is intended to be defined by the appended claims.

What is claimed is:

1. A grill pan comprising:
   a main body; and
   a plurality of individual ribs parallelly disposed on the main body, each of the individual ribs, in a sectional view thereof cut along a direction in which the rib is disposed, having a plurality of asymmetric wavy segments, each of the plurality of segments having a crest portion, a trough portion and a slope portion connecting the crest portion and the trough portion, the slope portion having a gradual slope, the crest portion of one of the segments connecting a neighboring segment through an arc transition.

2. The grill pan according to claim 1, wherein a ratio of a height of the crest portion to a height of the trough portion is equal to or greater than 1.5.

3. The grill pan according to claim 1, wherein each of the plurality of ribs has a breadth, and the breadths of the plurality of ribs are identical.

4. The grill pan according to claim 1, wherein central lines of two adjacent ribs of the plurality of ribs define an interval space, and the interval spaces between two adjacent ribs are identical.

5. The grill pan according to claim 4, wherein a ratio of the interval space to the breadth is equal to 3.

* * * * *